(12) United States Patent
Hanson et al.

(10) Patent No.: US 6,749,414 B1
(45) Date of Patent: Jun. 15, 2004

(54) EXTRUSION APPARATUS FOR THREE-DIMENSIONAL MODELING

(75) Inventors: Jeffery J. Hanson, Shakopee, MN (US); Michael David Bosveld, St. Paul, MN (US); John Samuel Batchelder, Somers, NY (US)

(73) Assignee: Stratasys, Inc., Eden Prairie, MN (US)

( * ) Notice: Subject to any disclaimer, the term of this patent is extended or adjusted under 35 U.S.C. 154(b) by 250 days.

(21) Appl. No.: 09/845,566

(22) Filed: Apr. 30, 2001

(51) Int. Cl.$^7$ ............................................. B29C 35/10
(52) U.S. Cl. ................. 425/130; 425/131.1; 425/174.4; 425/375
(58) Field of Search ............................... 425/375, 174.4, 425/130, 131.1; 264/308, 401

(56) References Cited

U.S. PATENT DOCUMENTS

| | | | | |
|---|---|---|---|---|
| 2,565,941 A | * | 8/1951 | Barnard | 264/258 |
| 3,933,967 A | * | 1/1976 | Taylor | 264/248 |
| 4,536,147 A | | 8/1985 | Groff | 425/323 |
| 5,121,329 A | | 6/1992 | Crump | 364/468 |
| 5,136,515 A | | 8/1992 | Helinski | 364/468 |
| 5,340,433 A | * | 8/1994 | Crump | 156/578 |
| 5,358,673 A | * | 10/1994 | Heller et al. | 264/401 |
| 5,503,785 A | | 4/1996 | Crump et al. | 264/40.7 |
| 5,569,349 A | | 10/1996 | Almquist et al. | 156/242 |
| 5,784,279 A | * | 7/1998 | Barlage et al. | 700/119 |
| 6,004,124 A | | 12/1999 | Swanson et al. | 425/375 |
| 6,030,199 A | * | 2/2000 | Tseng | 425/132 |
| 6,280,784 B1 | * | 8/2001 | Yang et al. | 426/231 |

FOREIGN PATENT DOCUMENTS

| | | | | |
|---|---|---|---|---|
| EP | 0426363 A2 | * | 5/1991 | G05B/19/41 |
| JP | 61-94722 | * | 5/1986 | B29C/41/04 |

* cited by examiner

*Primary Examiner*—Robert Davis
*Assistant Examiner*—Joseph S Del Sole
(74) *Attorney, Agent, or Firm*—Kinney & Lange, P.A.

(57) ABSTRACT

Disclosed is a multi-tip extrusion apparatus and design methodology whereby a single extrusion head having approximately co-planar, fixed-position dispensing tips is used in a three-dimensional modeling machine to deposit multiple types of materials from distinct material supply sources. The tips are spaced apart a distance great enough so that a road of material extruded by a leading one of the tips will cool and shrink from the plane of the tips so that it is not smeared by contact with a trailing one of the tips.

6 Claims, 3 Drawing Sheets

EXTRUSION APPARATUS FOR THREE-DIMENSIONAL MODELING

BACKGROUND OF THE INVENTION

This invention relates to the fabrication of three-dimensional objects using extrusion-based layered manufacturing techniques. More particularly, the invention relates to forming three-dimensional objects from multiple types of modeling materials that are extruded in a flowable state and solidify after being deposited onto a base.

Three-dimensional models are used for functions including aesthetic judgments, proofing the mathematical CAD model, forming hard tooling, studying interference and space allocation, and testing functionality. Extrusion-based layered manufacturing machines build up three-dimensional models by extruding solidifiable modeling material from a nozzle tip carried by an extrusion head onto a base. "Wetting" of the base by the extruded material serves to separate the modeling material from the tip. Movement of the extrusion head with respect to the base is performed in a predetermined pattern under computer control, in accordance with design data provided from a computer aided design (CAD) system. Examples of extrusion-based apparatus and methods for making three-dimensional objects are described in Valavaara U.S. Pat. No. 4,749,347, Crump U.S. Pat. No. 5,121,329, Crump U.S. Pat. No. 5,340,433, Crump et al. U.S. Pat. No. 5,503,785, Danforth, et al. U.S. Pat. No. 5,900,207, Batchelder, et al. U.S. Pat. No. 5,764,521, Swanson U.S. Pat. No. 6,004,124, Stuffle et al. U.S. Pat. No. 6,067,480 and Batchelder, et al. U.S. Pat. No. 6,085,957, all of which are assigned to Stratasys, Inc., the assignee of the present invention.

In the Stratasys FDM® three-dimensional modeling machines of the current art, the CAD design of an object is "sliced" into multiple horizontal layers by a software program. The machines then built up the object layer-by-layer by extruding modeling material in fluent strands, termed "roads". Each extruded road has a thickness equal to the height of a slice. The material being extruded fuses to previously deposited material and solidifies upon a drop in temperature to form a three-dimensional object resembling the CAD model. The modeling material is typically a thermoplastic or wax material. Alternatively, other types of materials, such as metals, which become flowable when heated, which solidify upon a drop in temperature, and which adhere to the previous layer with an adequate bond upon solidification can be employed.

In a an extrusion-based modeling system, modeling material is supplied to the extrusion head as a feedstock of either a liquid or a solid material. Where the feedstock of modeling material is in solid form, a liquifier brings the feedstock to a flowable temperature for deposition. One technique is to supply modeling material in the form of a filament strand. Solid material feedstocks may alternatively be in the form of wafers, rods, slugs, or the like. A pressurization means is used to extrude molten modeling material from the extrusion head.

In modeling systems that employ a filament feed, modeling material is loaded into the machine as a flexible filament wound on a supply spool, such as disclosed in U.S. Pat. No. 5,121,329. The extrusion head, which includes the liquifier and a dispensing nozzle, receives the filament, melts the filament in the liquifier, and extrudes molten modeling material from the nozzle. Typically, the filament has a small diameter, such as on the order of 0.070 inches. A pair of motor-driven feed rollers on the extrusion head controllably advance the filament strand into the liquifier, which is heated so as to melt the filament. The liquifier is pressurized by the "pumping" of the strand of filament into the liquifier by the feed rollers. The strand of filament itself acts as a piston, creating a "liquifier pump". The pressurization extrudes the molten modeling material out of an orifice of the nozzle at a volumetric flow rate, where it is deposited onto a base. The volumetric flow rate is a function of the size of the dispensing orifice and the rate of rotation of the feed rollers. By selective control of the feed-roller motor, the rate of advancement of the strand of filament, and thus the volumetric dispensing rate of the molten modeling material, can be closely controlled. A controller controls movement of the extrusion head in a horizontal x, y plane, controls movement of the base in a vertical z-direction, and controls the rate at which the feed rollers advance filament into the head. By controlling these processing variables in synchrony, the modeling material is deposited in roads at a desired flow rate, layer-by-layer, in areas defined from the CAD model. The dispensed material fuses and solidifies to form a three-dimensional object resembling the CAD model.

In building a model from a modeling material that thermally solidifies upon a drop in temperature, the modeling base is contained within a temperature-controlled build envelope. The build envelope is preferably a chamber which is heated to a temperature higher than the solidification temperature of the modeling material during deposition, and then gradually cooled to relieve stresses from the material. As disclosed in U.S. Pat. No. 5,866,058, this approach anneals stresses out of the model while is being built so that the finished model is stress free and has very little distortion.

In creating three-dimensional objects by depositing layers of solidifiable material, supporting layers or structures are built underneath overhanging portions or in cavities of objects under construction, which are not supported by the modeling material itself. For example, if the object is a model of the interior of a subterranean cave and the cave prototype is constructed from the floor towards the ceiling, then a stalactite will require a temporary support until the ceiling is completed. A support structure may be built utilizing the same deposition techniques and apparatus by which the modeling material is deposited. The apparatus, under appropriate software control, produces additional geometry acting as a support structure for the overhanging or free-space segments of the object being formed. Support material may be dispensed in a like fashion as the modeling material and in coordination with the dispensing of the modeling material, to build up supporting layers or a support structure for the object. Support material is deposited either from a separate dispensing head within the modeling apparatus, or by the same dispensing head that deposits modeling material. A support material is chosen that will adhere to the modeling material during construction, and that is removable from a completed object. Various combinations of modeling and support materials are known, such as are disclosed in U.S. Pat. No. 5,503,785.

To accommodate the dispensing of two different materials, the above-mentioned '329 patent discloses a dispensing head having multiple supply passages into which materials of different compositions may be directed, with each passage terminating in a separate dispensing orifice. The dispensing orifices of the '329 patent are arranged on a single broad-based nozzle tip, as shown in FIG. 11 thereof. Experimentation with broad-faced dispensing has tips taught, however, that a broad-faced tip drags against the road being extruded and smears out object features. Object corners are particularly problematic. If a corner does not get out from under a tip face before the tip changes directions, the tip face will drag against the corner. As the outer diameter of the tip face increases, the corner radius will increase as well, so that a narrow deposited road no longer makes fine features.

To overcome the feature smearing problems of multiple orifices, the above-mentioned '785 patent teaches an extrusion head having independent nozzle tips. The apparatus of the '785 patent uses an electromechanical method to move one tip higher or lower than the other, so that only the tip through which material is being extruded will contact the part surface. While the apparatus of the '785 patent eliminates smearing problems, it introduces significant issues of alignment and calibration. Z-axis calibration of the tips must be verified, as well as X and Y offset calibration. Calibration requirements decrease throughput and reliability. The mechanical complexity of toggling the two tips additionally lowers reliability and increases cost of the machine.

Two other methods for accommodating the dispensing of two different materials are also known: (1) providing two extrusion heads, each including one dispenser for receiving and dispensing one of the modeling materials (such as is disclosed in the '124 patent); and (2) providing a single extrusion head that dispenses two materials through a single orifice in a common dispensing tip, each material being provided to the tip from a separate flow path in the extrusion head (such as is shown in FIG. 6 of the '329 patent). These methods have disadvantages as well. Where two extrusion heads are provided, cost and size of the modeling machine are increased. Additionally, tip calibration becomes more difficult. A single tip dispensing two different materials avoids calibration issues but introduces other problems. The tip needs to be purged of one material before the other material can be dispensed, in order to avoid mixing of dissimilar materials. Material as well as build time are wasted in purging the tip. Also, if any of a first material remains despite the purging effort, the remaining first material will contaminate the second material resulting in possible degradation of model quality.

None of the known methods for dispensing multiple materials from different material supply sources are entirely satisfactory. There is an unmet need for a dispensing apparatus that dispenses multiple types of modeling materials and is free from the disadvantages of the prior art.

BRIEF SUMMARY OF THE INVENTION

The present invention is a multi-tip extrusion apparatus for three-dimensional modeling and a design methodology, whereby a single extrusion head carrying multiple dispensers having approximately co-planar, fixed-position tips is used to deposit multiple types of materials from distinct material supply sources. The tips are spaced apart a distance great enough so that a road of material extruded by a leading one of the tips will cool and shrink from the plane of the tips so that it is not smeared by contact with a trailing one of the tips. The apparatus of the present invention avoids the smearing, calibration, reliability, cost and throughput issues of the prior art techniques, enabling efficient production of good quality models. Additionally, by thermally insulating the dispensers from one another, the present invention may be utilized to dispense modeling materials having differing operating temperature ranges.

DETAILED DESCRIPTION

The multi-tip extrusion apparatus and design methodology of the present invention may be employed with respect to various types of modeling or prototyping systems which form three-dimensional objects by extruding solidifiable modeling material onto a base. Particularly applicable are those systems which utilize an extrusion head to deposit "roads" of material heated to be flowable, and which material shrinks and solidifies upon a drop in temperature to form a solid model. A preferred material deposition and build-up process is of the type disclosed in U.S. Pat. No. 5,121,329.

Figure 1:
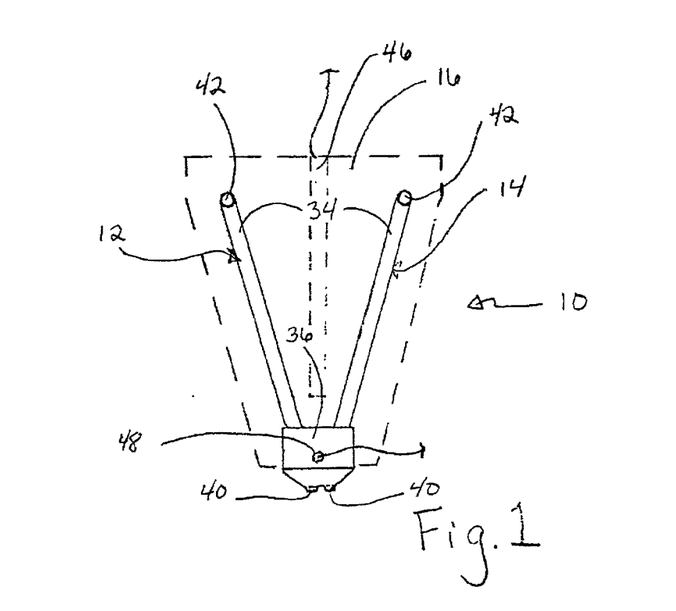
FIG. 1 is a front elevation of a first exemplary embodiment of an extrusion apparatus according to the present invention.
Figure 2:
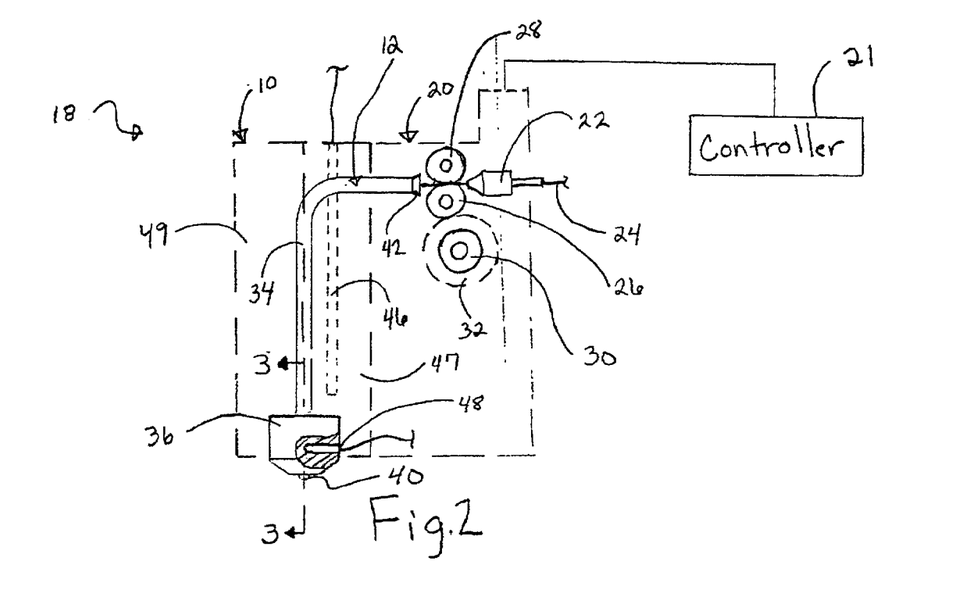
FIG. 2 is a left side elevation of an extrusion head which incorporates the extrusion apparatus of FIG. 1, with a portion shown in sectional.

FIG. 1 shows an extrusion apparatus 10 according to the present invention, comprised of a pair of dispensers 12 and 14 carried by a body 16. Each of the dispensers 12 and 14 is adapted to receive and dispense material from a distinct material supply source, such as is illustrated in FIG. 2. In a typical modeling application, one of dispensers 12 and 14 will receive and dispense a modeling material, while the other will receive and dispense a support material. Alternatively, the materials may be modeling materials of different colors or having other diverse properties.

FIG. 2 shows an extrusion head 18 comprised of the extrusion apparatus 10 mounted to a carriage 20. The extrusion head 18 is electrically coupled to a system controller 21. As shown, the carriage 20 is movable in a horizontal plane along X and Y axes under control of the controller 21, to permit depositing the material in a known manner in successive layers onto a horizontal base movable along a vertical Z-axis (not shown). Alternatively, it is recognized in the art that any three-dimensional relative movement between the extrusion head 18 and the base may be implemented to form a three-dimensional object. In the embodiment shown, carriage 20 includes a conduit 22 which receives a strand of filament 24 from a supply spool (not shown) of a type known in the art. The filament 24 is formed of a solid material that is flowable when heated and that is to be used in forming a model or a support structure for the model. Carriage 20 additionally includes a pair of feed rollers 26 and 28, a motor 30 and a gear 32, which comprise a suitable filament feed mechanism of a type known in the art. The roller pair 26 and 28 controllably advance the filament strand 24 into the dispenser 12. As shown, roller 26 is a drive roller while roller 28 is an idler. Motor 30 drives the roller 26 via the gear 32. A second filament feed mechanism (not shown) is provided on carriage 24, supplying a filament strand to dispenser 14 from a different supply spool (not shown).

Figure 3:
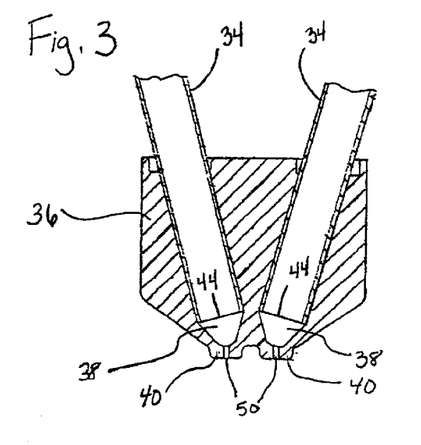
FIG. 3 is a sectional view of a portion of the first exemplary embodiment of an extrusion apparatus, taken along a line 3—3 of FIG. 2.

As shown in FIGS. 1–3, the pair of dispensers 12 and 14 are comprised of a pair of flow tubes 34, a nozzle 36 defining two separate flow channels 38, and a pair of co-planar discharge tips 40 of the nozzle 36. Each of the dispensers 12 and 14 define a separate and distinct flow path through the body 16. Each flow tube 34 has a receiving end 42 which defines an inlet to the flow path and a dispensing end 44 positioned to deliver a flow of material to one of the flow channels 38 of the nozzle 36. In the embodiment shown, the flow tubes 34 are thin-wall tubes of the type disclosed in U.S. Pat. No. 6,004,124. The flow tubes 34 are secured to the nozzle 36 such as by brazing. The flow tubes 23, the nozzle 36 and the body 16 are made of a heat conductive material, so as to enable maintaining the flow path at a temperature at which the material being supplied is flowable. The body 16 contains a heating rod 46 extending therethrough. Heating rod 46 is ohmically controlled by the system controller 21 to heat the body 16, which conducts heat to the flow tubes 34 and the nozzle 36. Where the material is supplied as a solid, as in the embodiment shown, the material is liquified in the flow tubes 34, and then flows through the nozzle 36 for dispensing. To monitor the temperature of the extrusion apparatus 10, a thermocouple may be utilized. A thermocouple 48 is shown positioned in the nozzle 36 between the flow channels 38, allowing careful monitoring of the discharge temperature of the material by the system controller 21. If the temperature gets too high, the system controller 21 can toggle off the heating rod 46.

The body 16 may be conveniently manufactured in multiple sections which are mechanically detachable to permit cleaning and replacement of the dispensers 12 and 14. As illustrated in FIG. 2, the body 16 has a back section 47 and a front section 49. The dispensers 12 and 14 clamp between the sections 47 and 49, in a manner similar to that described in U.S. Pat. No. 6,004,124.

Figure 4:
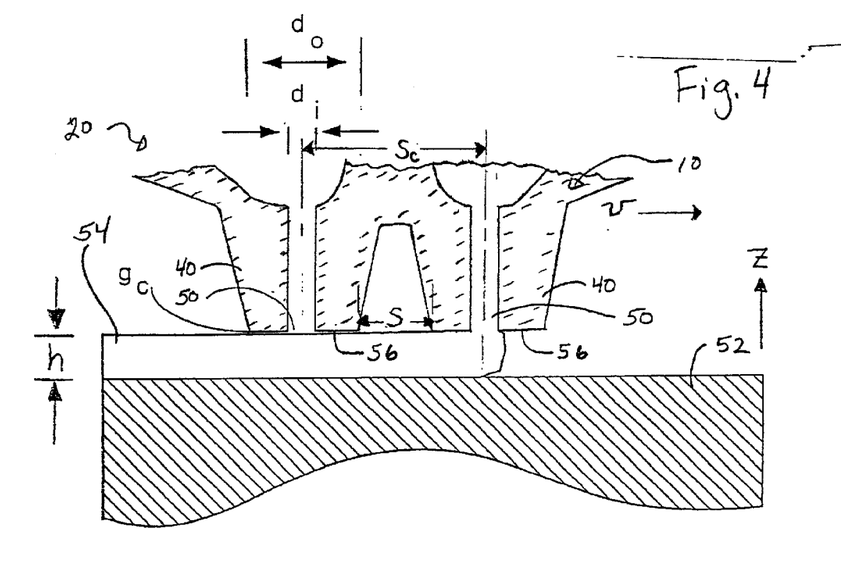
FIG. 4 is an enlarged sectional view of the two tips of the extrusion apparatus of FIG. 3, shown in a dispensing mode.

As shown in FIGS. 3 and 4, each dispensing tip 40 defines a discharge orifice 50 through which molten material is extruded. Each discharge orifice 50 receives flowable material from one of the flow channels 38 of the nozzle 36. FIG. 4 illustrates the dispensing of extrudate material onto a base 52 by one of the tips 40, so as to build up a three-dimensional object. The base 52 may be a substrate approximating a plane on which models are built, or it may be previously deposited layers of modeling material. The material is extruded as a road 54 having a thickness h. As shown in FIG. 4, the extrusion head 20 carrying extrusion apparatus 10 is moving forward at a velocity v as material is extruded through the orifice 50 of the leading tip 40 and the trailing tip is idle.

In a typical application, the velocity v varies as the extrusion head 20 proceeds through a path comprising a start point, a stop point and multiple vertices. Each vertex is assigned a velocity v, representing the velocity at which the extrusion head 20 can be driven through that vertex without exceeding an allowable error. The extrusion head 20 preferably accelerates and decelerates between vertices so as to achieve a high throughput, in a manner such as is disclosed in U.S. Pat. No. 6,054,077.

As mentioned above, the tips 40 of the first exemplary embodiment are co-planar. The tips 40 each have a downward face 56 and the faces 56 are at the same Z-height. In practice of the present invention, typical manufacturing tolerances will result in the tip faces being in only approximately the same plane (i.e., approximately the same Z-height). Approximate co-planarity is acceptable within the tolerances given below. In reference to FIG. 4, each downward face 56 has an outer diameter $d_o$ and an inner diameter $d_I$ defining the orifice 50. The inner and outer diameter of the tips 40 may be the same, or these dimensions may be different, as desired for a given application. The centerline tip-to-tip spacing is given by the variable $s_c$, while the spacing between the tip faces 56 is given by the variable s. According to the design methodology of the present invention, a minimum spacing between the tips 40 is mathematically predicted according to the tip geometry, build conditions and extrudate material of a given application, so that one tip will not smear the extrudate deposited by the other. The tip spacing requirements will now be described.

The material deposited is one which will solidify upon encountering a predetermined condition, such as the controlled temperature in a build envelope in which modeling takes place. Virtually all materials of interest shrink as they cool and solidify. According to the present invention, the spacing s between the tip faces 54 is greater than or equal to a predetermined minimum value which provides a predetermined time-lag $\Delta t$ between the two tip faces 56. The spacing between the tips 40 is made great enough to allow extrudate material freshly deposited by the leading tip 40 to cool and shrink before the trailing tip 40 passes over it, so that the trailing tip 40 will not drag across and smear a road 54 that it did not extrude. This design overcomes the problem of the prior art broad-faced tips, wherein feature detail would be destroyed by the passing of a non-extruding tip surface. The minimum tip spacing can be calculated for a given tip geometry, build conditions and extrudate material. Before describing the mathematical analysis, the following additional parameters are first defined:

$v_{min}$=minimum tip velocity at a vertex $a_{max}$=maximum tip acceleration $k_e$=extrudate thermal conductivity $C_p$=extrudate heat capacity $T_e$=extrudate temperature emerging from tip $T_g$=extrudate temperature upon relative solidification $T_b$=build environment temperature T(t)=extrudate temperature t seconds following its emergence from the tip a=extrudate thermal expansion coefficient p=extrudate average density $k_a$=air thermal conductivity $K_e$=extrudate thermal diffusivity The thermal diffusivity $K_e$ is defined according to the equation:

$$K_e = \frac{k_e}{Cp\rho} \quad (1)$$

As the road 54 deposited by the leading tip 40 cools, it shrinks away from the z-plane of the tips. In order to prevent the trailing tip 40 from dragging across and smearing the road 54, the spacing s between the tip faces 56 is made great enough so that the road 54 should shrink sufficiently during the transit time between the two tips 40 as to leave a gap between the road 54 and the trailing tip face 56. According to the present invention, the spacing s is a distance calculated to result in at least a critical gap $g_c$ between the trailing tip face 56 and the extruded road 54. We define the critical gap $g_c$ as the amount of air between the trailing tip face 56 and the extruded road 54 that doubles the thermal resistance between the trailing tip face 56 and the center of the road (as compared to no gap). Using this definition, and assuming perfect co-planarity of tip faces 56, the critical gap may be expressed according to the equation:

$$g_c = \frac{h}{2}\left(\frac{k_a}{k_e - k_a}\right) \quad (2)$$

Additionally, the fractional expansion of the road thickness (i.e. $g_c/h$) is known to be equal to the product of the extrudate thermal expansion coefficient and the drop in extrudate temperature from the time it is deposited to the time the trailing tip 40 goes by. The drop in extrudate temperature required to create the critical gap may thus characterized by the following equation:

$$T_e - T(t) = \frac{g_c}{h\alpha} \quad (3)$$

The time required to create this change in temperature (ignoring air convection) can be calculated according to the equation[1]:

[1] H. S. Carslaw and J. C. Jaeger, *Conduction of Heat in Solids*, Oxford Science Publications, 2d ed., p. 98.

$$\Delta t = \frac{0.3h^2}{K_e} \quad (4)$$

Assuming that a corner is printed at the minimum tip vertex velocity, the criteria for the spacing between the tips becomes:

$$v_{min}\Delta t + \frac{1}{2}a_{max}\Delta t^2 \leq s \quad (5)$$

Several observations can be made regarding tip spacing criteria in a three-dimensional fused deposition modeling system:

- Spacing requirements increase linearly with minimum tip vertex velocity.
- Spacing requirements increase linearly with maximum tip acceleration.
- Spacing requirements increase quadratically with road thickness for low acceleration gantries. Stated otherwise, decreasing the road thickness offsets the effects of increasing velocity.
- Spacing requirements increase as the fourth power of road thickness for high acceleration gantries ($a_{max} > 2v_{min}/\Delta t$).
- Spacing requirements decrease with increasing extrudate thermal conductivity.
- Spacing requirements decrease as the temperature of the emerging extrudate is increased, for a fixed build environment temperature (more thermal shrink and faster temperature change).
- Spacing requirements increase linearly with tip outer diameter (since $s = s_c - d_o$ for same-sized tips).
- An acceptable manufacturing tolerance on the tip face co-planarity is that the z-height of the tip faces (measured along the center line of the orifices) may be offset a distance approaching the critical gap $g_c$. Within this tolerance range, the trailing tip should have at least about a clearance fit with the extruded road.
- It is desirable to keep the tips as close together as the criteria permit, as this will minimize impact of any nominal tilt of the base from horizontal.

Figure 5:
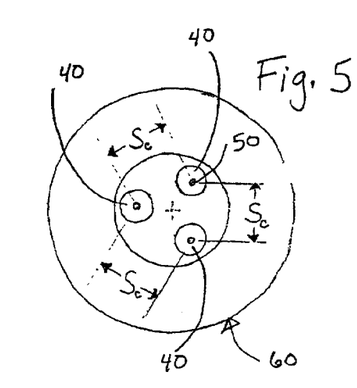
FIG. 5 is a bottom plan view of a second exemplary embodiment of an extrusion apparatus according to the present invention.

For some applications, it may be desirable to deposit more than two different types of materials from the same extrusion head. For such applications, the present invention can be utilized in an embodiment having more than two tips, such as is illustrated in FIG. 5. FIG. 5 shows a nozzle 60 having three tips 40. As with the first exemplary embodiment described above, the tips 40 of nozzle 60 are integral with dispensers adapted to receive material from three different material supply sources, permitting the selective dispensing of any one of the three materials. The tip spacing criteria derived with respect to the first exemplary embodiment having two tips 40 applies also to embodiments having three or more tips. Applying the spacing criteria to an embodiment having three or more tips, the minimum spacing between any two of the tips must satisfy equation 5.

EXAMPLE

An example is given in which theoretical results are compared to experimental results. In this example, the build conditions are that of a Stratasys FDM® three-dimensional modeling machine depositing ABS thermoplastic, according to the parameters given in Table 1 below:

TABLE 1

| VARIABLE | VALUE |
|---|---|
| $d_0$ | 45 mils (1.14E-4 meter) |
| $d_1$ | 12 mils (3.05E-4 meter) |
| $s_c$ | 100 mils (2.54E-3 meter) |
| h | 10 mils (2.54E-4 meter) |
| $v_{min}$ | 0.9 ips (0.023 meter/sec) |
| $\alpha_{max}$ | 3 inches/sec² (7.77E-3 g's) |
| $k_e$ | 1.4 watt/(meter ° C.) |
| $C_p$ | 1.8 joule/(gram ° C.) |
| $T_e$ | 270° C. |
| $T_g$ | 140° C. |
| $T_b$ | 70° C. |
| $\alpha$ | 8E-5/° C. |
| $\rho$ | 1.1 gram/centimeter³ |
| $k_a$ | 0.016 watt/(meter ° C.) |

The thermal diffusivity for the above example parameters, calculated according to equation (1), is 7.07E-7 meters²/sec. The critical gap, calculated according to equation (2), is 0.06 mils (1.5 microns). Applying equation (3), the change in temperature required to create the critical gap is predicted to be 72° C. The time required to create this change in temperature, predicted according to equation (4), is 27 milliseconds. Finally, equation (5) predicts that the spacing s between the tip faces should be greater than or equal to 0.025 inches. A nozzle having a spacing s of 0.065 inches was utilized on a Stratasys FDM three-dimensional modeling machine depositing ABS thermoplastic under the above example parameters. The model quality was observed to by unimpaired by the passing of the trailing tip.

Figures 6, 7:
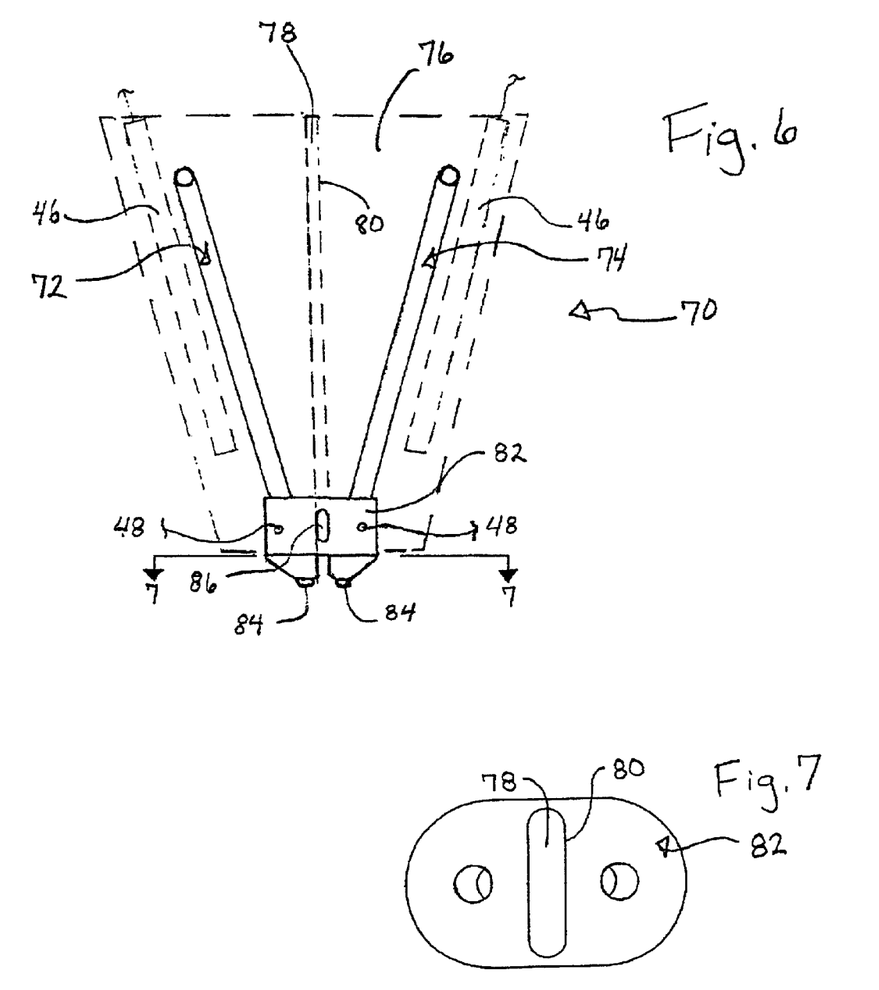
FIG. 6 is a front elevation of a third exemplary embodiment of an extrusion apparatus according to the present invention.
FIG. 7 is a cross-sectional view of the nozzle of the extrusion apparatus of FIG. 6.

A third exemplary embodiment of the present invention is shown in FIGS. 6 and 7. FIG. 6 shows an extrusion apparatus 70 having two dispensers 72 and 74 in a body 76, wherein the body 76 further includes a thermal insulator 78 and two heating rods 46. The thermal insulator 78 is positioned between the dispensers 72 and 74 to provide a degree of thermal separation between the dispensers. The two heating rods 46 are located on opposite sides of the thermal insulator 78. The dispensers 72 and 74 are of the same general type as dispensers 12 and 14 of embodiment one. The dispensers 72 and 74 share a common nozzle 82 which includes two dispensing tips 84. As is best shown in FIG. 7, the thermal insulator 78 is ambient air that fills a vertical channel 80 extending through the body 76 and the nozzle 82, and a horizontal channel 86 extending through the nozzle 82. The air insulator may be stagnant air or moving air. The thermal insulator 78 may alternatively be any insulating material that will provide a desired degree of thermal separation between the two dispensers. The thermal insulator 78 allows the dispensers 72 and 74 to be maintained at diverse temperatures by the heating rods 46. Two thermocouples 48 are thus utilized, one positioned in each of the dispensers 72 and 74. The thermal separation between the dispensers 72 and 74 provided by the third exemplary embodiment is useful where it is desirable to maintain the two extrusion materials at different temperature elevations, such as where the two materials have significantly different melting points. Again, the tip spacing criteria derived with respect to the first exemplary embodiment applies equally to the third exemplary embodiment.

Various modification may be made to the thermally-insulated embodiment shown in FIGS. 6 and 7 that will increase the temperature gradient between the two dispensers 72 and 74. For example, increasing the size of the channel 80 will provide a greater degree of thermal separation between dispensers 72 and 74 by increasing the volume of insulating air, as will boring channels through the body 76 to the exterior walls of the channel 80. It should further be understood that the body 76 and nozzle 82 can be physically separated into right and left sections by a solid insulator (e.g., a high temperature plastic or a ceramic material), to maximize the temperature gradient between the dispensers 72 and 74. It should be noted, however, that providing the nozzle as a single piece is advantageous provided that adequate thermal separation can be maintained, as calibration of tip position becomes an issue using a multi-piece nozzle. The thermally-insulated embodiment can be further modified to include three or more dispensers, with some or all of the dispensers thermally separated from one another, with each of the dispenser tips satisfying the spacing criteria.

Although the present invention has been described with reference to preferred embodiments, workers skilled in the art will recognize that changes may be made in form and detail without departing from the spirit and scope of the invention. For example, it should be understood that while the present invention is shown and described herein as receiving modeling material in the form of a filament strand provided by a filament feed mechanism, the extrusion apparatus of the present invention can be utilized to advantage in modeling systems which receive other types of material feed stocks from other types of feed mechanisms, including liquid feed stocks. It will also be appreciated that various modifications may be made to the dispensers in keeping with the teachings of the present invention. The flow tubes, for example, could be eliminated by instead boring flow channels through the body itself. It will further be appreciated that innumerable other various modifications may be made to the extrusion apparatus of the present invention.

What is claimed is:

1. A modeling machine of the type which builds three-dimensional objects by depositing thermally solidifiable modeling material as a road of molten material having a height h into a build environment having a temperature lower than an extrudate temperature of the material, and from an extrusion head that moves at a known speed in a predetermined cross-sectional pattern, comprising:

a first supply of a first thermally solidifiable modeling material, in the form of a continuous filament;

a second supply of a second thermally solidifiable modeling material, in the form of a continuous filament;

a first thermally conductive dispenser carried by the extrusion head and having an inlet for receiving the first supply of the first thermally solidifiable modeling material and a tip for dispensing roads of the first material in molten form, the tip of the first dispenser having a downward face positioned in approximately a z-plane;

a second thermally conductive dispenser carried by the extrusion head and having an inlet for receiving the second supply of the second thermally solidifiable modeling material and a tip for dispensing roads of the second material in molten form, the tip of the second dispenser being maintained in a fixed vertical position relative to the tip of the first dispenser, and having a downward face spaced apart a distance s from the face of the first dispenser and positioned in approximately the same z-plane as the face of the first dispenser;

a thermally conductive body in which the dispensers are carried;

a thermal insulator positioned in the body so as to provide thermal separation between the dispensers;

a means for heating the first dispenser to a temperature at which the first material is flowable; and a means for heating the second dispenser to a temperature at which the second material is flowable;

wherein the distance s is great enough that a road deposited by one of the tips will shrink due exclusively to cooling during a minimum transit time $\Delta t$ between the tips such that the other one of the tips does not drag across and smear the road.

2. The modeling machine of claim 1, wherein the thermal insulator comprises ambient air that fills a cavity in the body.

3. The modeling machine of claim 1, wherein the thermal insulator comprises a solid material.

4. The modeling machine of claim 1, wherein the road has a thermal diffusivity $K_e$, and wherein the minimum transit time is characterized by the relationship $$\Delta t = \frac{0.3 h^2}{K_a}.$$

5. The modeling machine of claim 4, wherein the extrusion head accelerates and decelerates through a path comprising multiple vertices and the tips have a minimum vertex velocity $v_{min}$ and a maximum acceleration $a_{max}$, and wherein the spacing s is characterized by the relationship $v_{min}\Delta t + 1/2 a_{max}\Delta t^2 \leq s$.

6. In a modeling machine of the type which builds three-dimensional objects by depositing thermally solidifiable modeling material as a road of molten material having a height h into a build environment having a temperature lower than an extrudate temperature of the material, and from an extrusion head that moves at a known speed in a predetermined cross-sectional pattern, the improvement comprising:

a first thermally conductive dispenser carried by the extrusion head and having an inlet for receiving a first thermally solidifiable modeling material and a tip for dispensing roads of the first material in molten form, the tip of the first dispenser having a downward face positioned in approximately a z-plane; and a second thermally conductive dispenser carried by the extrusion head and having an inlet for receiving a second thermally solidifiable modeling material and a tip for dispensing roads of the second material in molten form, the tip of the second dispenser being maintained in a fixed vertical position relative to the tip of the first dispenser, and having a downward face spaced apart a distance s from the face of the first dispenser and positioned in approximately the same z-plane as the face of the first dispenser;

a thermally conductive body in which the dispensers are carried;

a thermal positioned in the body so as to provide thermal separation between the dispensers;

a means for heating the first dispenser to a temperature at which the first material is flowable; and a means for heating the second dispenser to a temperature at which the second material is flowable.

* * * * *

UNITED STATES PATENT AND TRADEMARK OFFICE
CERTIFICATE OF CORRECTION

PATENT NO. : 6,749,414 B1
DATED : June 15, 2004
INVENTOR(S) : Jeffery J. Hanson et al.

It is certified that error appears in the above-identified patent and that said Letters Patent is hereby corrected as shown below:

Column 1,
Line 50, delete "In a an", insert -- In an --

Column 2,
Line 31, delete "while is", insert -- while it --

Signed and Sealed this

Twenty-eighth Day of June, 2005

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,749,414 B1 | |
| APPLICATION NO. | : 09/845566 | |
| DATED | : June 15, 2004 | |
| INVENTOR(S) | : Jeffery J. Hanson and Michael David Bosveld | |

It is certified that error appears in the above-identified patent and that said Letters Patent is hereby corrected as shown below:

Column 12,
Line 1, after "thermal" and before "positioned", insert -- insulator --

Signed and Sealed this
Thirty-first Day of July, 2012

David J. Kappos
*Director of the United States Patent and Trademark Office*